(12) United States Patent
Sun et al.

(10) Patent No.: US 9,313,476 B2
(45) Date of Patent: Apr. 12, 2016

(54) PRECHARGED LATCHED PIXEL CELL FOR A TIME OF FLIGHT 3D IMAGE SENSOR

(71) Applicant: OMNIVISION TECHNOLOGIES, INC., Santa Clara, CA (US)

(72) Inventors: Tianjia Sun, Santa Clara, CA (US); Rui Wang, San Jose, CA (US); Tiejun Dai, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 80 days.

(21) Appl. No.: 14/454,542

(22) Filed: Aug. 7, 2014

(65) Prior Publication Data

US 2016/0044296 A1    Feb. 11, 2016

(51) Int. Cl.
*H04N 5/3745* (2011.01)
*H04N 13/02* (2006.01)

(52) U.S. Cl.
CPC ....... *H04N 13/0203* (2013.01); *H04N 13/0271* (2013.01); *H04N 13/0296* (2013.01)

(58) Field of Classification Search
CPC .. H04N 5/37206; H04N 5/335; H04N 5/3745
See application file for complete search history.

(56) References Cited

U.S. PATENT DOCUMENTS

| 6,628,258 | B1 | 9/2003 | Nakamura |
| 7,326,903 | B2 | 2/2008 | Ackland |
| 2009/0128477 | A1 | 5/2009 | Hayashi et al. |
| 2012/0056078 | A1* | 3/2012 | Eldesouki ............ H04N 5/3745 250/214 DC |
| 2012/0057059 | A1* | 3/2012 | Eldesouki ......... H01L 27/14601 348/302 |
| 2012/0057152 | A1* | 3/2012 | Eldesouki ................. G01J 1/46 356/226 |
| 2013/0162778 | A1 | 6/2013 | Kurokawa |
| 2013/0228691 | A1 | 9/2013 | Shah |
| 2013/0248689 | A1* | 9/2013 | Eldesouki ................. G01J 1/46 250/208.1 |

FOREIGN PATENT DOCUMENTS

| TW | 548470 | 8/2003 |
| TW | 200822707 A | 5/2008 |
| TW | 200923483 A | 6/2009 |
| TW | 201329875 A | 7/2013 |
| TW | 201339644 A | 10/2013 |

OTHER PUBLICATIONS

TW Patent Application No. 103138404—Taiwanese Office Action and Search Report, mailed Dec. 16, 2015, with English Translation (12 pages).

* cited by examiner

*Primary Examiner* — Ricardo L Osorio
(74) *Attorney, Agent, or Firm* — Blakely Sokoloff Taylor & Zafman LLP

(57) ABSTRACT

A pixel cell includes a latch having an input terminal and an output terminal. The latch is coupled to provide a latched output signal at the output terminal responsive to the input terminal. A first precharge circuit is coupled to precharge the input terminal of the latch to a first level during a reset of the pixel cell. A single photon avalanche photodiode (SPAD) is coupled to provide a SPAD signal to the input terminal of the latch in response to a detection of a photon incident on the SPAD.

16 Claims, 6 Drawing Sheets

PRECHARGED LATCHED PIXEL CELL FOR A TIME OF FLIGHT 3D IMAGE SENSOR

BACKGROUND INFORMATION

1. Field of the Disclosure

This invention is related to image sensors. In particular, embodiments of the present invention are related to three dimensional image sensors.

2. Background

Interest in three dimensional (3D) cameras is increasing as the popularity 3D applications continues to grow in applications such as imaging, movies, games, computers, user interfaces, and the like. A typical passive way to create 3D images is to use multiple cameras to capture stereo or multiple images. Using the stereo images, objects in the images can be triangulated to create the 3D image. One disadvantage with this triangulation technique is that it is difficult to create 3D images using small devices because there must be a minimum separation distance between each camera in order to create the three dimensional images. In addition, this technique is complex and therefore requires significant computer processing power in order to create the 3D images in real time.

For applications that require the acquisition of 3D images in real time, active depth imaging systems based on the optical time of flight measurement are sometimes utilized. Time of flight systems typically employ a light source that directs light at an object, a sensor that detects the light that is reflected from the object, and a processing unit that calculates the distance to the object based on the round trip time that it takes for light to travel to and from an object. In typical time of flight sensors, photodiodes are often used because of the high transfer efficiency from the photo detection regions to the sensing nodes.

A continuing challenge with the acquisition of 3D images is that the required processing must occur very quickly in order for the 3D image acquisition system to resolve time differences. With such short response times required for real time applications, the overall transient currents in 3D image sensors can be very high because all of the pixels in the 3D sensors can detect light at substantially the same time. The very high transient currents can occur in a very short amount of time and consequently cause noise and voltage drops on the power line, which will have detrimental effects on the working states of all of the pixels on the 3D sensors.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
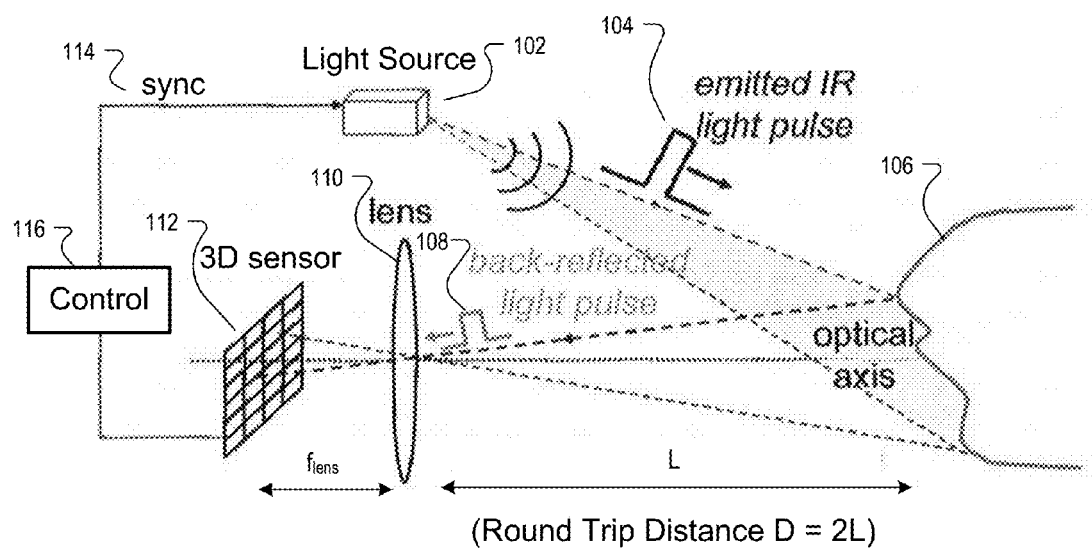
FIG. 1 is a block diagram that shows one example of a time of flight sensing system in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Methods and apparatuses for acquiring time of flight and depth information using a 3D time of flight sensor are disclosed. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. For example, the term "or" is used in the inclusive sense (e.g., as in "and/or") unless the context clearly indicates otherwise.

As will be shown, examples of a time of flight sensing system including time of flight pixel cells are disclosed. In various examples, time of flight pixel cells in accordance with the teachings of the present invention include precharge circuits that precharge the pixel cells each time the pixel cell is reset before detecting photons. The example pixel cells also include latches, which latch the voltage swings caused by avalanche events that occur in single photon avalanche diodes (SPADs) that are included in the pixel cells. By precharging the pixel cells at each reset, the power consumption of the SPADs included in the pixel cells will be limited to the precharge quantity of each pixel cell, which therefore reduces the overall power consumption of the pixel cells in accordance with the teachings of the present invention. In addition, the precharge circuits are deactivated after each reset before avalanche events occur in each pixel cell, which therefore isolates very high transient currents from affecting the power lines, and therefore reduces noise, and voltage drops on the power line, and thus reduces crosstalk with other pixel cells on the sensor in accordance with the teachings of the present invention.

To illustrate, FIG. 1 is a block diagram that shows one example of a time of flight sensing system 100 in accordance with the teachings of the present invention. As shown, time of flight sensing system 100 includes a light source 102 that emits light pulses, which are illustrated as emitted light 104 in FIG. 1. As shown, emitted light 104 is directed to an object 106. In one example, emitted light 104 includes pulses of infrared (IR) light. It is appreciated that in other examples, emitted light 104 may have wavelengths other than infrared, such as for example visible light, near-infrared light, etc., in accordance with the teachings of the present invention. Emitted light 104 is then reflected back from object 106, which is shown as back reflected light 108 in FIG. 1. As shown in the depicted example, reflected light 108 is directed from object 106 through a lens 110 and is then focused onto a time of flight pixel array 112, which is also labeled 3D sensor in FIG. 1. In one example, time of flight pixel array 112 includes a plurality of time of flight pixel cells arranged in a two dimensional array. In one example, a sync signal 114 is generated by control circuitry 116 coupled to time of flight pixel array 112, which synchronizes the pulses of emitted light 104 with corresponding signals that control the plurality of pixel cells in time of flight pixel array 112, which sense the reflected light 108, in accordance with the teachings of the present invention.

In the example depicted in FIG. 1, it is noted that time of flight pixel array 112 is positioned at a focal length $f_{lens}$ from lens 110. As shown in the example, the light source 102 and the lens 110 are positioned a distance L from the object. It is appreciated of course that FIG. 1 is not necessarily illustrated to scale and that in one example, the focal length $f_{lens}$ is substantially less than the distance L between lens 110 and object 106. Therefore, it is appreciated that for the purposes of this disclosure, the distance L and the distance L+focal length $f_{lens}$ are substantially equal for purposes of time of flight measurements in accordance with the teachings of the present invention. In addition, it is also appreciated that for the purposes of this disclosure, the distance between the light source 102 and the object 106, and the distance between the object 106 and the lens 110, and are also both substantially equal to L for purposes of time of flight measurements in accordance with the teachings of the present invention. Accordingly, the distance between the light source 102 and the object 106 (and/or the distance between the object 106 and the lens 110) is equal to half of the round trip distance, e.g., D, which is therefore equal to 2×L. In other words, it is assumed that the distance L from light source 102 to the object 106, plus the distance L back from the object 106 to the lens 110, is equal to the round trip distance D (or 2×L) in accordance with the teachings of the present invention.

In the depicted example, there is a delay time of TOF between the emission of a light pulse of emitted light 104 and the receipt of that light pulse in reflected light 108, which is caused by the amount of time that it takes for the light pulse to travel the distance L from light source 102 to object 106, and then the additional time it takes for the corresponding reflected light pulse 108 to travel the distance L back from object 106 to pixel array 112. The time difference TOF between emitted light 104 and reflected light 108 represents the time of flight for the light pulses to make the round trip between the light source 102 and object 106. Once the time of flight TOF is known, the distance L from light source 102 to object 106 can be determined using the following relationships in Equations 1 and 2 below:

$$TOF = \frac{2 \times L}{c} \quad (1)$$

$$L = \frac{T_{TOF} \times c}{2} \quad (2)$$

where c is the speed of light, which is approximately equal to $3 \times 10^8$ m/s, and TOF is the amount of time that it takes for the light pulse to travel to and from the object as shown in FIG. 1.

Figure 2:
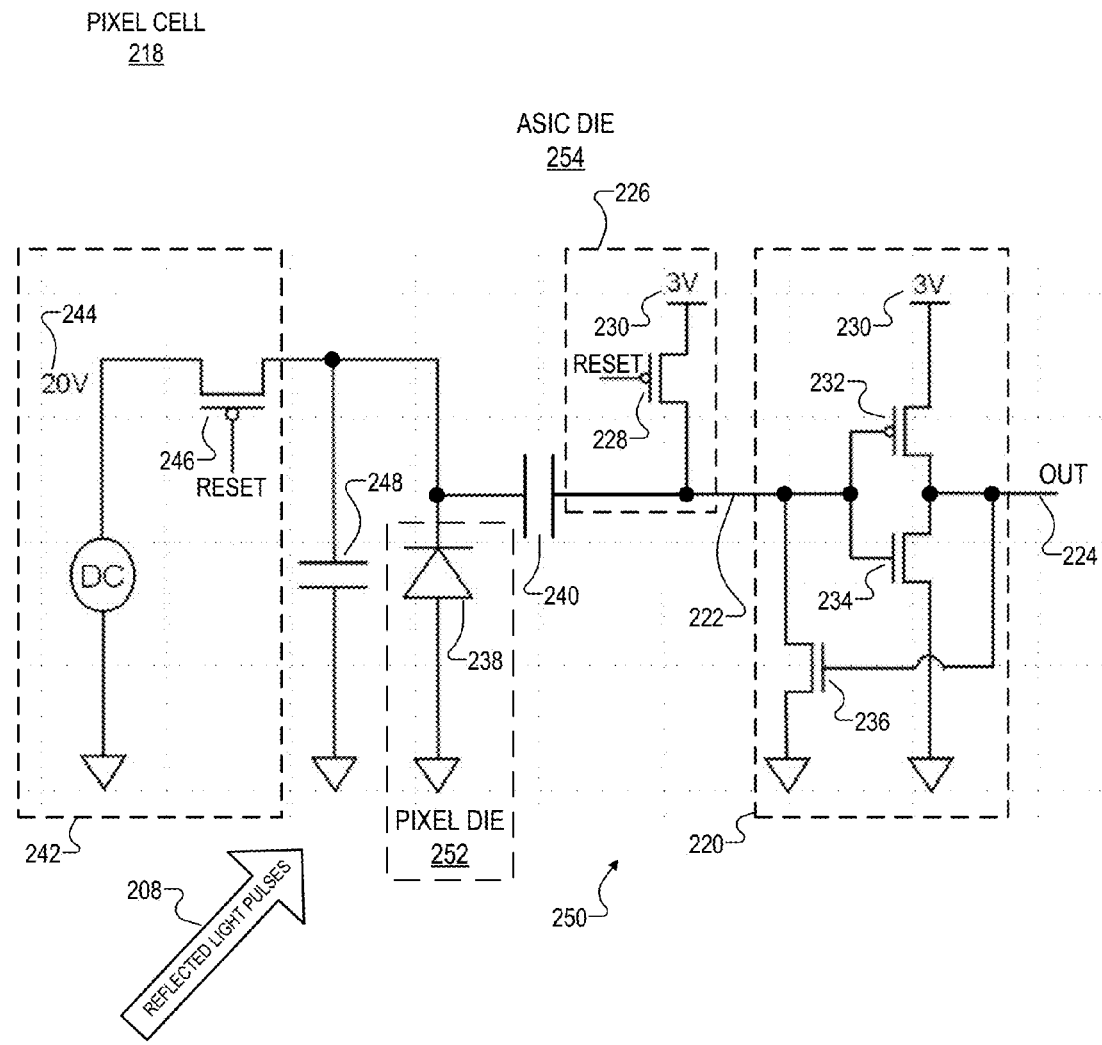
FIG. 2 is a schematic illustrating one example of a time of flight pixel cell in accordance with the teachings of the present invention.

FIG. 2 is a schematic illustrating one example of a time of flight pixel cell 218 in accordance with the teachings of the present invention. It is appreciated that pixel cell 218 may be one example of one of the plurality of pixel cells that are included for example in time of flight pixel array 112 of FIG. 1, and that similarly named and numbered elements referenced below are therefore coupled and function similar to as described above. As shown in the depicted example, pixel cell 218 includes a photosensor 238 that is coupled to pixel support circuitry 250. In one example, photosensor 238 is a single photon avalanche diode (SPAD) that is disposed in a pixel die 252 and pixel support circuitry 250 is circuitry that is disposed on an application specific integrated circuit (ASIC) die 254. In the example, the anode of SPAD 238 is coupled to ground and the cathode of SPAD 238 is AC coupled to the input terminal 222 of latch 220 through capacitive coupling 240. In one example, the pixel die 252 and the ASIC die 254 are coupled together and implemented in a stacked chip scheme.

In one example, pixel support circuitry 250 of pixel cell 218 includes a latch 220, which has an input terminal 222 and an output terminal 224. As will be discussed, latch 220 is coupled to provide a latched output signal at the output terminal 224 in response to the input terminal 222. Pixel support circuitry 250 of pixel cell 218 also includes a first precharge circuit 226, which is coupled to precharge the input terminal 222 of the latch 220 to a first level during a reset of the pixel cell 218. For instance, in the illustrated example, first precharge circuit 226 includes a first precharge switch 228 that is coupled to a power line 230 that provides 3 volts. In operation, first precharge circuit 226 is coupled to precharge input terminal 222 to 3 volts in response to a RESET signal, which is activated during each reset operation of pixel cell 218 before photons are detected by pixel cell 218 in accordance with the teachings of the present invention. In the example, after the reset operation is complete and the input terminal 222 has been precharged to the first level (e.g., 3 volts), the RESET signal is deactivated, which deactivates first precharge switch 228 and decouples and isolates the power line 230 from the input terminal 222. It is noted that after the reset operation, the output terminal 224 is initialized to have a latched output signal value of for example 0 volts because switch 232 is switched OFF, switch 234 is switched ON, and feedback switch 236 is switched OFF with the input terminal 222 initialized to 3 volts through precharge circuit 226 in accordance with the teachings of the present invention.

Continuing with the example depicted in FIG. 2, SPAD 238 is then coupled to provide a SPAD signal to the input terminal 222 in response to an avalanche event, which occurs in SPAD 238 in response to a detection of a photon in reflected light pluses 208 incident on the SPAD 238 in accordance with the teachings of the present invention. To illustrate, pixel support circuitry 250 includes a capacitive coupling 240 coupled between SPAD 238 and input terminal 222 to AC couple SPAD 238 to input terminal 222. When a photon is detected in reflected light pulses 208 by SPAD 238, an avalanche event occurs in SPAD 238, which lowers the voltage at input terminal 222 through the AC coupling provided by capacitive coupling 240 from the precharged level (e.g., from 3 volts) to a lower voltage (e.g., 0 volts). With the voltage at input terminal 222 at 0 volts, switch 232 is then switched ON, and switch 234 is switched OFF, which therefore changes the voltage at the output terminal 224 from the initialized reset value of 0 volts to 3 volts. With the output terminal 224 at 3 volts, the feedback switch 236 is then switched ON, which therefore latches the input terminal 222 to zero volts through feedback switch 236 as shown, which therefore latches the output signal 224 at 3 volts in accordance with the teachings of the present invention.

In the example depicted in FIG. 2, it is appreciated that pixel cell 218 may also include a second precharge circuit 242 that is coupled to precharge the SPAD 238 to a power line 244 that provides a second level (e.g., 20 volts) during the reset of the pixel cell 218 in accordance with the teachings of the present invention. In one example, second precharge circuit 242 is also disposed in ASIC die 254. As shown in the example, the second precharge circuit 242 may include a second precharge switch 246 to couple the SPAD 238 to a second voltage (e.g., 20 volts) from power line 244 during the reset of the pixel cell 218 in accordance with the teachings of the present invention. It is appreciated that with the AC coupling provided with capacitive coupling 240, the power line 244 and power line 230 may provide different voltages on both sides of capacitive coupling 240 as shown.

In the example, the SPAD 238 is decoupled from the second voltage (e.g., 20 volts) from power line 244 after the reset of the pixel cell 218 in accordance with the teachings of the present invention. In the depicted example, pixel cell 218 may also include an in-pixel capacitor 248 coupled to the SPAD 238 and coupled to the second precharge circuit 242 as shown. As such, the second precharge circuit 242 is therefore further coupled to precharge the in-pixel capacitor 248 to the second level (e.g., 20 volts) during the reset of the pixel cell 218 in accordance with the teachings of the present invention.

Accordingly, it is appreciated that with the SPAD 238 decoupled from power line 244 and power line 230 after the reset of the pixel cell 218, the quantity of power consumed by SPAD 238 is limited to the precharge quantity of power in pixel cell 218 in accordance with the teachings of the present invention. Therefore, it is appreciated that the overall power consumption of the pixel cell 218 is reduced because the precharge circuit 226 and precharge circuit 242 are deactivated after each reset before avalanche events occur in SPAD 238. The isolation of SPAD 238 isolates very high transient currents that occur in SPAD 238 during an avalanche event from affecting the power line 230 and power line 244, and therefore reduces noise, and voltage drops on the power line 230 and power line 244, and thus reduces crosstalk with other pixel cells on the sensor in accordance with the teachings of the present invention.

Figure 3:
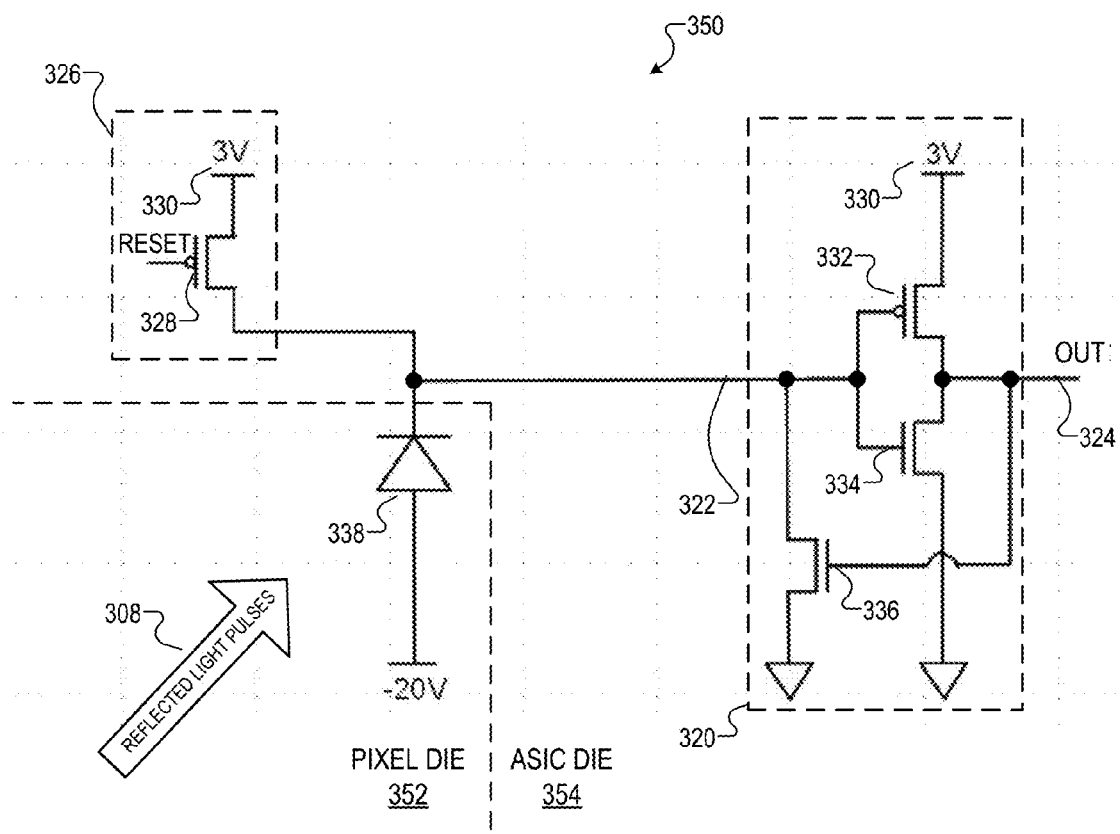
FIG. 3 is a schematic illustrating another example of a time of flight pixel cell in accordance with the teachings of the present invention.

FIG. 3 is a schematic illustrating another example of a time of flight pixel cell 318 in accordance with the teachings of the present invention. It is appreciated that pixel cell 318 of FIG. 3 may be one example of one of the plurality of pixel cells that are included for example in time of flight pixel array 112 of FIG. 1. It is also noted that pixel cell 318 of FIG. 3 also shares some similarities with pixel cell 218 of FIG. 2, and that similarly named and numbered elements referenced below are therefore coupled and function similar to as described above. For instance, as shown in the depicted example, pixel cell 318 includes a photosensor 338 that is coupled to pixel support circuitry 350. In the example, photosensor 338 is a SPAD that is disposed in a pixel die 352 and pixel support circuitry 350 is circuitry that is disposed on an ASIC die 354. In the example, the pixel die 352 and the ASIC die 354 are coupled together and implemented in a stacked chip scheme.

In the example depicted in FIG. 3, pixel support circuitry 350 of pixel cell 318 includes a latch 320, which has an input terminal 322 and an output terminal 324. Pixel support circuitry 350 of pixel cell 318 also includes a first precharge circuit 326, which is coupled to precharge the input terminal 322 of the latch 320 to a first level during a reset of the pixel cell 318. First precharge circuit 326 includes a first precharge switch 328 that is coupled to a power line 330 that provides 3 volts. In operation, first precharge circuit 326 is coupled to precharge input terminal 322 to 3 volts in response to a RESET signal, which is activated during each reset operation of pixel cell 318 before photons are detected by pixel cell 318 in accordance with the teachings of the present invention. In the example, after the reset operation is complete and the input terminal 322 has been precharged to the first level (e.g., 3 volts), the RESET signal is deactivated, which deactivates first precharge switch 328 and decouples and isolates the power line 330 from the input terminal 322. It is noted that after the reset operation, the output terminal 324 is initialized to have a latched output signal value of for example 0 volts because switch 332 is switched OFF, switch 334 is switched ON, and feedback switch 336 is switched OFF with the input terminal 322 initialized to 3 volts through precharge circuit 326 in accordance with the teachings of the present invention.

Continuing with the example depicted in FIG. 3, SPAD 338 is then coupled to provide a SPAD signal to the input terminal 322 in response to an avalanche event, which occurs in SPAD 338 in response to a detection of a photon in reflected light pluses 308 incident on the SPAD 338 in accordance with the teachings of the present invention. In the example, the anode of SPAD 338 is coupled to −20 volts and the cathode of SPAD 338 is coupled to the input terminal 322 of latch 320. When a photon is detected in reflected light pulses 308 by SPAD 338, an avalanche event occurs in SPAD 338, which lowers the voltage at input terminal 322 from the precharged level (e.g., from 3 volts) to a low voltage. With the voltage at input terminal 322 at a low voltage, switch 332 is then switched ON, and switch 334 is switched OFF, which therefore changes the voltage at the output terminal 324 from the initialized reset value of 0 volts to 3 volts. With the output terminal 324 at 3 volts, the feedback switch 336 is then switched ON, which therefore latches the input terminal 322 to 0 volts through feedback switch 336 as shown, which therefore latches the output signal 324 at 3 volts in accordance with the teachings of the present invention.

It is appreciated that with the SPAD 338 decoupled from power line 330 after the reset of the pixel cell 318, the quantity of power consumed by SPAD 338 is limited to the precharge quantity of power in pixel cell 318 in accordance with the teachings of the present invention. Therefore, it is appreciated that the overall power consumption of the pixel cell 318 is reduced because the precharge circuit 326 is deactivated after each reset before avalanche events occur in SPAD 338. The isolation of SPAD 338 isolates very high transient currents that occur in SPAD 338 during an avalanche event from affecting the power line 330, and therefore reduces noise, and voltage drops on the power line 330, and thus reduces crosstalk with other pixel cells on the sensor in accordance with the teachings of the present invention.

Figure 4:
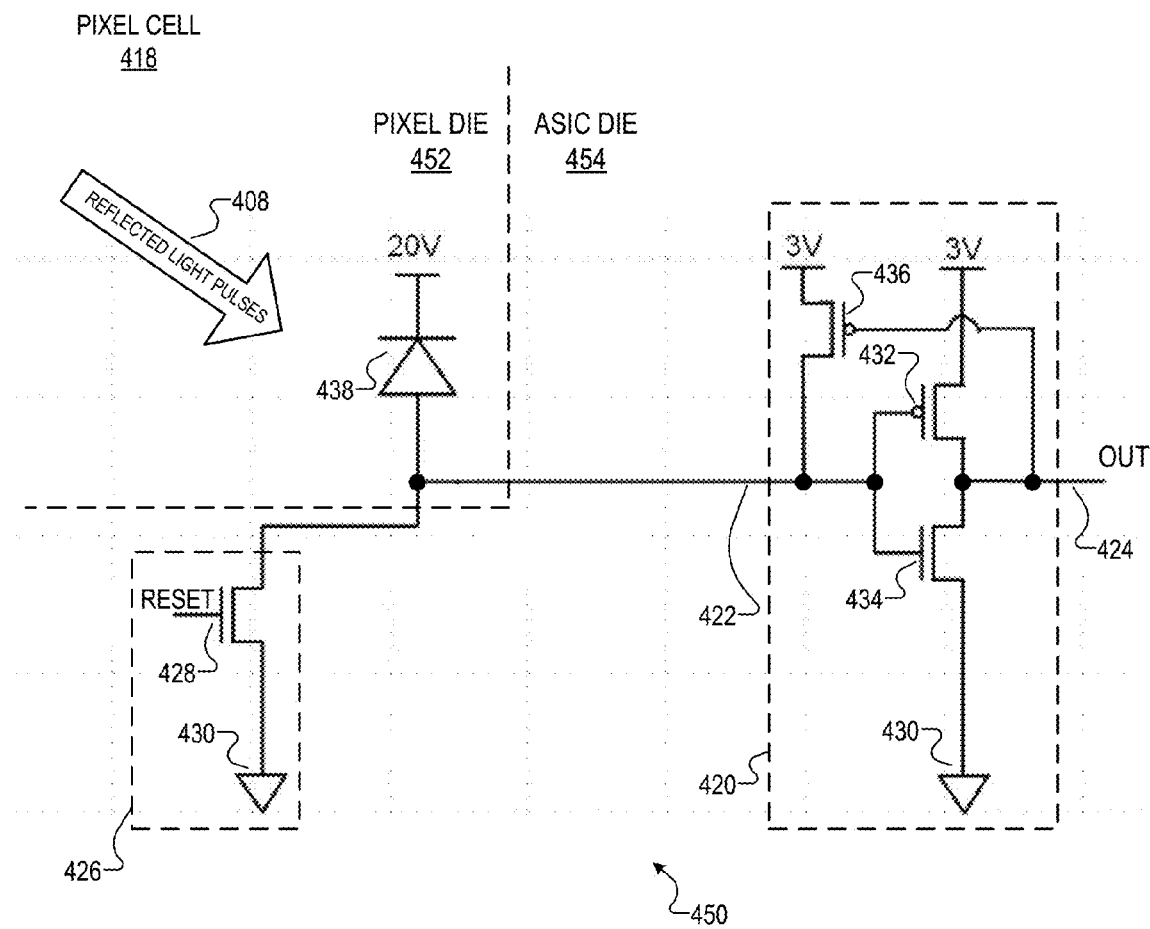
FIG. 4 is a schematic illustrating yet another example of a time of flight pixel cell in accordance with the teachings of the present invention.

FIG. 4 is a schematic illustrating yet another example of a time of flight pixel cell 418 in accordance with the teachings of the present invention. It is appreciated that pixel cell 418 of FIG. 4 may be one example of one of the plurality of pixel cells that are included for example in time of flight pixel array 112 of FIG. 1. It is also noted that pixel cell 418 of FIG. 4 also shares similarities with pixel cell 318 of FIG. 3, and that similarly named and numbered elements referenced below are therefore coupled and function similar to as described above. For instance, as shown in the depicted example, pixel cell 418 includes a photosensor 438 that is coupled to pixel support circuitry 450. In the example, photosensor 438 is a SPAD that is disposed in a pixel die 452 and pixel support circuitry 450 is circuitry that is disposed on an ASIC die 454. In the example, the pixel die 452 and the ASIC die 454 are coupled together and implemented in a stacked chip scheme.

In the example depicted in FIG. 4, pixel support circuitry 450 of pixel cell 418 includes a latch 420, which has an input terminal 422 and an output terminal 424. Pixel support circuitry 450 of pixel cell 418 also includes a first precharge circuit 426, which is coupled to precharge the input terminal 422 of the latch 420 to a first level during a reset of the pixel cell 418. First precharge circuit 426 includes a first precharge switch 428 that is coupled to a power line 430 that provides 0 volts. In operation, first precharge circuit 426 is coupled to precharge input terminal 422 to 0 volts in response to a RESET signal, which is activated during each reset operation of pixel cell 418 before photons are detected by pixel cell 418 in accordance with the teachings of the present invention. In the example, after the reset operation is complete and the input terminal 422 has been precharged to the first level (e.g., 0 volts), the RESET signal is deactivated, which deactivates first precharge switch 428 and decouples and isolates the power line 430 from the input terminal 422. It is noted that after the reset operation, the output terminal 424 is initialized to have a latched output signal value of for example 3 volts because switch 432 is switched ON, switch 434 is switched OFF, and feedback switch 436 is switched OFF with the input terminal 422 initialized to 0 volts through precharge circuit 426 in accordance with the teachings of the present invention.

Continuing with the example depicted in FIG. 4, SPAD 438 is then coupled to provide a SPAD signal to the input terminal 422 in response to an avalanche event, which occurs in SPAD 438 in response to a detection of a photon in reflected light pluses 408 incident on the SPAD 438 in accordance with the teachings of the present invention. In the example, the cathode of SPAD 438 is coupled to 20 volts and the anode of SPAD 438 is coupled to the input terminal 422 of latch 420. When a photon is detected in reflected light pulses 408 by SPAD 438, an avalanche event occurs in SPAD 438, which in the example illustrated in FIG. 4 increases the voltage at input terminal 422 from the precharged level (e.g., from 0 volts) to a higher voltage. With the voltage at input terminal 422 at a higher voltage, switch 432 is then switched OFF, and switch 434 is switched ON, which therefore changes the voltage at the output terminal 424 from the initialized reset value of 3 volts to 0 volts. With the output terminal 424 at 0 volts, the feedback switch 436 is then switched ON, which therefore latches the input terminal 422 to 3 volts through feedback switch 436 as shown, which therefore latches the output signal at output terminal 424 at 0 volts in accordance with the teachings of the present invention.

It is appreciated that with the SPAD 438 decoupled from power line 430 after the reset of the pixel cell 418, the quantity of power consumed by SPAD 438 is limited to the precharge quantity of power in pixel cell 418 in accordance with the teachings of the present invention. Therefore, it is appreciated that the overall power consumption of the pixel cell 418 is reduced because the precharge circuit 426 is deactivated after each reset before avalanche events occur in SPAD 438. The isolation of SPAD 438 isolates very high transient currents that occur in SPAD 438 during an avalanche event from affecting the power line 430, and therefore reduces noise, and voltage drops on the power line 430, and thus reduces crosstalk with other pixel cells on the sensor in accordance with the teachings of the present invention.

Figure 5:
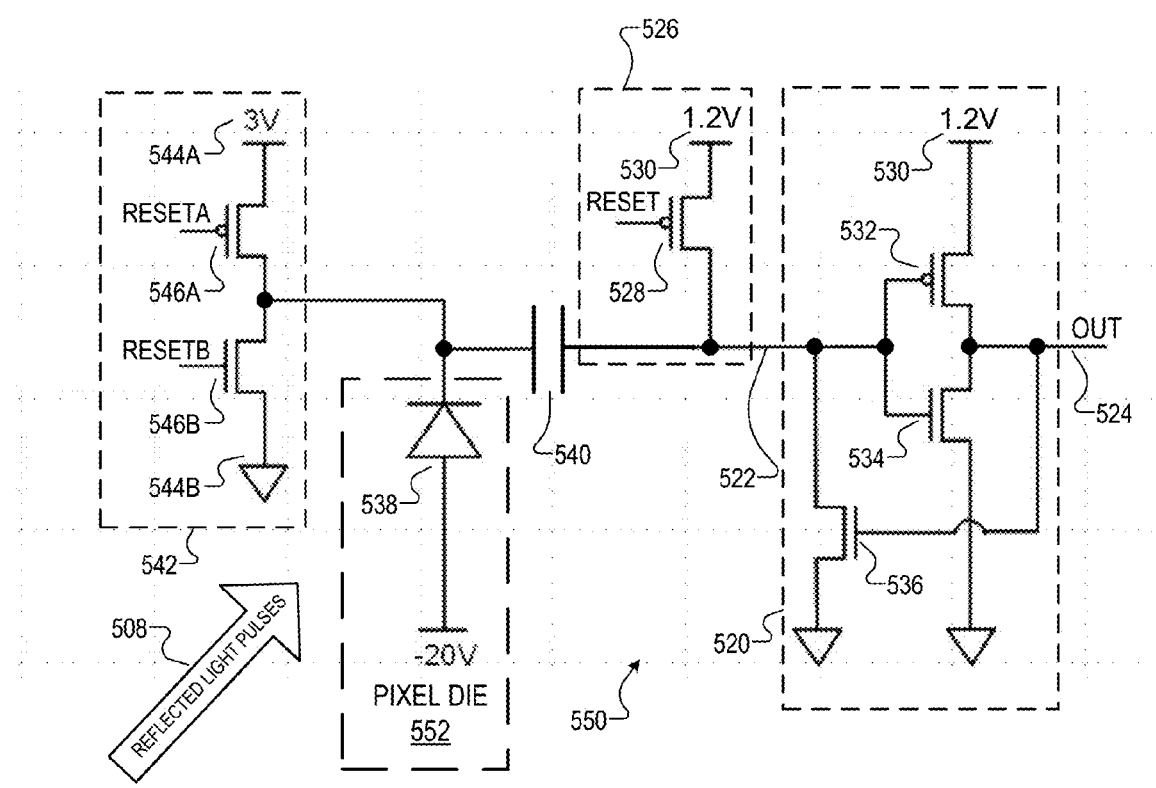
FIG. 5 is a schematic illustrating still another example of a time of flight pixel cell in accordance with the teachings of the present invention.

FIG. 5 is a schematic illustrating still another example of a time of flight pixel cell 518 in accordance with the teachings of the present invention. It is appreciated that pixel cell 518 of FIG. 5 may be one example of one of the plurality of pixel cells that are included for example in time of flight pixel array 112 of FIG. 1. It is also noted that pixel cell 518 of FIG. 5 also shares some similarities with pixel cell 218 of FIG. 2, and that similarly named and numbered elements referenced below are therefore coupled and function similar to as described above. For instance, as shown in the depicted example, pixel cell 518 includes a photosensor 538 that is coupled to pixel support circuitry 550. In the example, photosensor 538 is a SPAD that is disposed in a pixel die 552 and pixel support circuitry 550 is circuitry that is disposed on an ASIC die 554. In the example, the anode of SPAD 538 is coupled to −20 volts and the cathode of SPAD 538 is AC coupled to the input terminal 522 of latch 520 through capacitive coupling 540. In the example, the pixel die 552 and the ASIC die 554 are coupled together and implemented in a stacked chip scheme.

In one example, pixel support circuitry 550 of pixel cell 518 includes a latch 520, which has an input terminal 522 and an output terminal 524. Latch 520 is coupled to provide a latched output signal at the output terminal 524 in response to the input terminal 522. Pixel support circuitry 550 of pixel cell 518 also includes a first precharge circuit 526, which is coupled to precharge the input terminal 522 of the latch 520 to a first level during a reset of the pixel cell 518. For instance, in the illustrated example, first precharge circuit 526 includes a first precharge switch 528 that is coupled to a power line 530 that provides 1.2 volts. In operation, first precharge circuit 526 is coupled to precharge input terminal 522 to 1.2 volts in response to a RESET signal, which is activated during each reset operation of pixel cell 518 before photons are detected by pixel cell 518 in accordance with the teachings of the present invention. In the example, after the reset operation is complete and the input terminal 522 has been precharged to the first level (e.g., 1.2 volts), the RESET signal is deactivated, which deactivates first precharge switch 528 and decouples and isolates the power line 530 from the input terminal 522. It is noted that after the reset operation, the output terminal 524 is initialized to have a latched output signal value of for example 0 volts because switch 532 is switched OFF, switch 534 is switched ON, and feedback switch 536 is switched OFF with the input terminal 522 initialized to 1.2 volts through precharge circuit 526 in accordance with the teachings of the present invention.

Continuing with the example depicted in FIG. 5, SPAD 538 is then coupled to provide a SPAD signal to the input terminal 522 in response to an avalanche event, which occurs in SPAD 538 in response to a detection of a photon in reflected light pluses 508 incident on the SPAD 538 in accordance with the teachings of the present invention. To illustrate, pixel support circuitry 550 includes a capacitive coupling 540 coupled between SPAD 538 and input terminal 522 to AC couple SPAD 538 to input terminal 522. When a photon is detected in reflected light pulses 508 by SPAD 538, an avalanche event occurs in SPAD 538, which lowers the voltage at input terminal 522 through the AC coupling provided by capacitive coupling 540 from the precharged level (e.g., from 1.2 volts) to a lower voltage. With the voltage at input terminal 522 at the lower voltage, switch 532 is then switched ON, and switch 534 is switched OFF, which therefore changes the voltage at the output terminal 524 from the initialized reset value of 0 volts to 1.2 volts. With the output terminal 524 at 1.2 volts, the feedback switch 536 is then switched ON, which therefore latches the input terminal 522 to zero volts through feedback switch 536 as shown, which therefore latches the output signal 524 at 1.2 volts in accordance with the teachings of the present invention.

In the example depicted in FIG. 5, it is appreciated that pixel cell 518 may also include a second precharge circuit 542 that is coupled to precharge the SPAD 538 to a second level, or alternatively a third level. In one example, second precharge circuit 542 is also disposed in ASIC die 554. In the example depicted in FIG. 5, second precharge circuit 542 includes a switch 546A, which may couple the cathode of SPAD 538 to a power line 544A to precharge SPAD 538 to for example 3 volts in response to a RESETA signal as shown. In the depicted example, second precharge circuit 542 may also include a switch 546B, which may alternatively couple the cathode of SPAD 538 to a power line 544B to precharge SPAD 538 to for example 0 volts in response to a RESETB signal as shown. It is appreciated that with the AC coupling provided with capacitive coupling 540, the power lines 544A or 544B and power line 530 may provide different voltages on both sides of capacitive coupling 540 as shown. In the example, the RESETA and RESETB signals are deactivated to decouple the cathode of SPAD 538 from power line 544A or power line 544B after the reset of the pixel cell 518 in accordance with the teachings of the present invention.

Accordingly, it is appreciated that with the SPAD 538 decoupled from power line 544A, power line 544B and power line 530 after the reset of the pixel cell 518, the quantity of power consumed by SPAD 538 is limited to the precharge quantity of power in pixel cell 518 in accordance with the teachings of the present invention. Therefore, it is appreciated that the overall power consumption of the pixel cell 518 is reduced because the precharge circuit 526 and precharge circuit 542 are deactivated after each reset before avalanche events occur in SPAD 538. The isolation of SPAD 538 isolates very high transient currents that occur in SPAD 538 during an avalanche event from affecting the power line 530, power line 544A, and power line 544B, and therefore reduces noise, and voltage drops on the power line 530, power line 544A, and 544B, and thus reduces crosstalk with other pixel cells on the sensor in accordance with the teachings of the present invention.

Figure 6:
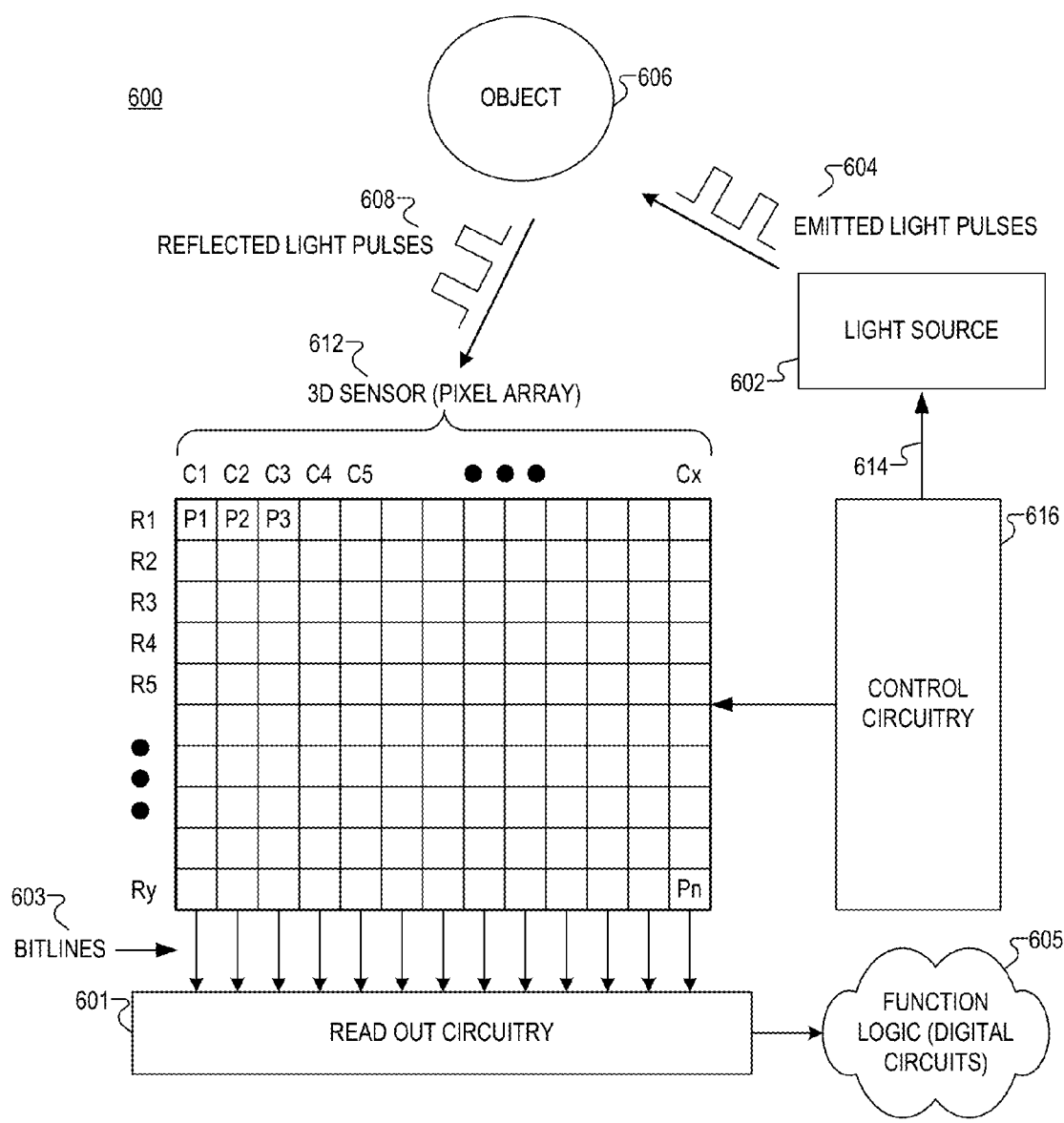
FIG. 6 is block diagram that shows a portion of an example time of flight sensing system including a time of flight pixel array with corresponding readout circuitry, control circuitry and function logic in accordance with the teachings of the present invention.

FIG. 6 is block diagram that shows a portion of an example time of flight sensing system 600 including a time of flight pixel array with corresponding readout circuitry, control circuitry and function logic in accordance with the teachings of the present invention. As shown, the illustrated example of time of flight sensing system 600 includes a time of flight pixel array 612, readout circuitry 601, function logic 605, control circuitry 616, and a light source 602 to sense the round trip distance to object 606 in accordance with the teachings of the present invention.

In the example illustrated in FIG. 6, pixel array 612 is a two dimensional (2D) array of time of flight pixel cells (e.g., pixels P1, P2 . . . , Pn). In one example, each of the time of flight pixels P1, P2, . . . , Pn may be substantially similar to one of the time of flight pixels discussed above in FIGS. 2-5, and that similarly named and numbered elements referenced below are therefore coupled and function similar to as described above. As illustrated, each pixel cell is arranged into a row (e.g., rows R1 to Ry) and a column (e.g., column C1 to Cx) to acquire time of flight information of an image object 606 focused onto pixel array 612. Thus, the time of flight information can then be used to determine the distance or depth information to the object 606 in accordance with the teachings of the present invention.

In one example, control circuitry 616 controls and synchronizes light source 602 with a sync signal 614 to emit light pulses 604 to object 606. The reflected back light pulses 608 are then reflected back to pixel array 612 as shown. In one example, the pixel cells in pixel array 612 sense the photons from the reflected back light pulses 608, and the corresponding latched output signals responsive to the avalanche events that occur in the SPADs included in the pixel cells in pixel array 612, as discussed above, are then read out by read out circuitry 601 through bitlines 603 as shown. In one example, read out circuitry 601 may include amplifiers to amplify the signals received through bitlines 603. In one example, the information read out by read out circuitry 601 may then be transferred to digital circuits included in the function logic 605 in accordance with the teachings of the present invention. In one example, function logic 605 may determine the time of flight and distance information for each pixel. In one example, function logic may also store the time of flight information and/or even manipulate the time of flight information (e.g., crop, rotate, adjust for background noise, or the like). In one example, read out circuitry 601 may read out an entire row of time of flight information at a time along the bitlines 603 (illustrated), or in another example may readout the time of flight information using a variety of other techniques (not illustrated), such as a serial readout or a full parallel readout of all pixels simultaneously. In the illustrated example, control circuitry 616 is further coupled to pixel array 612 to control the operation of pixel array 612, as well as synchronize the operation of pixel array 612 with light source 602.

In one example, it is noted that time of flight sensing system 600 illustrated in FIG. 6 may be implemented in a stacked chip scheme. For instance, in one example, pixel array 612 may be included in a pixel die, while read out circuitry 601, function logic 605, and control circuitry 616, as illustrated in FIG. 6, may be included in a separate ASIC die in accordance with the teachings of the present invention. In the example, the pixel die and ASIC die are stacked and coupled together during fabrication to implement a time of flight sensing system in accordance with the teachings of the present invention.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:
1. A pixel cell, comprising:
  a latch having an input terminal and an output terminal, wherein the latch is coupled to provide a latched output signal at the output terminal responsive to the input terminal;
  a first precharge circuit coupled to precharge the input terminal of the latch to a first level during a reset of the pixel cell; and a single photon avalanche photodiode (SPAD) coupled to provide a SPAD signal to the input terminal of the latch in response to a detection of a photon incident on the SPAD.

2. The pixel cell of claim 1 further comprising a capacitive coupling coupled between the input terminal of the latch and the SPAD to AC couple the SPAD to the input terminal of the latch.

3. The pixel cell of claim 1 wherein the first precharge circuit comprises a first precharge switch to couple the input terminal of the latch to a first voltage during the reset of the pixel cell, wherein the input terminal of the latch is decoupled from the first voltage after the reset of the pixel cell.

4. The pixel cell of claim 1 further comprising a second precharge circuit coupled to precharge the SPAD to a second level during the reset of the pixel cell.

5. The pixel cell of claim 4 wherein the second precharge circuit comprises a second precharge switch to couple the SPAD to a second voltage during the reset of the pixel cell, wherein the SPAD is decoupled from the second voltage after the reset of the pixel cell.

6. The pixel cell of claim 4 further comprising an in-pixel capacitor coupled to the SPAD and coupled to the second precharge circuit, wherein the second precharge circuit is further coupled to precharge the in-pixel capacitor to the second level during the reset of the pixel cell.

7. The pixel cell of claim 1 wherein the latch and the first precharge circuit are included in pixel support circuitry, wherein the SPAD is included in a first die and wherein the pixel support circuitry is included in a second die, wherein the first die and second die are stacked and coupled together.

8. A time of flight sensing system, comprising:
a light source to emit light pulses to an object;
a time of flight pixel array having a plurality of pixel cells, wherein each one of the pixel cells comprises:
a latch having an input terminal and an output terminal, wherein the latch is coupled to provide a latched output signal at the output terminal responsive to the input terminal;
a first precharge circuit coupled to precharge the input terminal of the latch to a first level during a reset of the pixel cell; and
a single photon avalanche photodiode (SPAD) coupled to provide a SPAD signal to the input terminal of the latch in response to a detection of a photon reflected from the object; and control circuitry coupled to the light source and to the time of flight pixel array to synchronize a timing of the emission of the light pulses with the sensing of the photon reflected from the object.

9. The time of flight sensing system of claim 8 wherein each one of the pixel cells further comprises a capacitive coupling coupled between the input terminal of the latch and the SPAD to AC couple the SPAD to the input terminal of the latch.

10. The time of flight sensing system of claim 8 wherein the first precharge circuit comprises a first precharge switch to couple the input terminal of the latch to a first voltage during the reset of the pixel cell, wherein the input terminal of the latch is decoupled from the first voltage after the reset of the pixel cell.

11. The time of flight sensing system of claim 8 wherein each one of the pixel cells further comprises a second precharge circuit coupled to precharge the SPAD to a second level during the reset of the pixel cell.

12. The time of flight sensing system of claim 11 wherein the second precharge circuit comprises a second precharge switch to couple the SPAD to a second voltage during the reset of the pixel cell, wherein the SPAD is decoupled from the second voltage after the reset of the pixel cell.

13. The time of flight sensing system of claim 11 wherein each one of the pixel cells further comprises an in-pixel capacitor coupled to the SPAD and coupled to the second precharge circuit, wherein the second precharge circuit is further coupled to precharge the in-pixel capacitor to the second level during the reset of the pixel cell.

14. The time of flight sensing system of claim 8 wherein the latch and the first precharge circuit are included in pixel support circuitry, wherein the SPAD is included in a first die and wherein the pixel support circuitry is included in a second die, wherein the first die and second die are stacked and coupled together.

15. The time of flight sensing system of claim 8 further comprising readout circuitry coupled to read out pixel data from the time of flight pixel array.

16. The time of flight sensing system of claim 15 further comprising function logic coupled to the readout circuitry to store and process the pixel data read out from the time of flight pixel array.

* * * * *